United States Patent [19]

Reaux

[11] Patent Number: 4,822,075
[45] Date of Patent: Apr. 18, 1989

[54] FLANGED REPAIR COUPLING FOR PIPE LINE SERVICE

[76] Inventor: James R. Reaux, P.O. Box 2700, LaFayette, La. 70502

[21] Appl. No.: 55,910

[22] Filed: Jun. 1, 1987

[51] Int. Cl.$^4$ ............................................. F16L 35/00
[52] U.S. Cl. ......................................... 285/3; 285/15; 285/323; 285/363; 285/175
[58] Field of Search ...................... 285/15, 3, 322, 323, 285/363, 175

[56] References Cited

U.S. PATENT DOCUMENTS

| | | | |
|---|---|---|---|
| 4,006,921 | 2/1977 | Mohn | 285/323 X |
| 4,049,297 | 9/1977 | Reneau | 285/322 X |
| 4,138,147 | 2/1979 | Manchester et al. | 285/323 X |
| 4,239,266 | 12/1980 | Mynhier | 265/323 |
| 4,330,143 | 5/1982 | Reneau | 285/322 |
| 4,413,845 | 11/1983 | Lawrence | 285/323 X |
| 4,613,160 | 9/1986 | Reneau | 285/323 X |

OTHER PUBLICATIONS

Hydro Tech.
Grippers Inc.

Primary Examiner—Dave W. Arola
Attorney, Agent, or Firm—William H. Maxwell

[57] ABSTRACT

A flanged coupling for the repair of pipelines and risers, especially for sub-marine repair and construction, and of unit configuration engageable over a first open pipe section and its flange to seal with a flange of a second open pipe section, and having a piston actuated by drawing said two flanges together and a shear member sequentially controlling operation of a slip and a packing to anchor and seal the coupling unit to the first pipe section operating a slip and a packing to anchor and seal the coupling unit to the first pipe section.

19 Claims, 4 Drawing Sheets

FLANGED REPAIR COUPLING FOR PIPE LINE SERVICE

BACKGROUND OF THE INVENTION:

This invention relates to the maintenance and repair of pipelines that carry or supply fluids, and especially those which are subsurface, such as those which are sub-marine. It is risers which are of special concern and any other type or disposition of piping, and all of which require additions, deletions, maintenance and repair. Therefore, it is common practice that pipeline servicing requires cutting into and the replacement of sections of such pipe and risers. Prior art methods of pipe line servicing have involved tedious underwater adjustments and welding in order to complete such service operations and repair and/or replacement of pipe sections and risers, and the couplings employed tend to be complex and involved with respect to the procedure required in order to install them. It is therefore a general object of this invention to provide a repair coupling for pipe lines and risers which is simple and uncomplicated and which is made secure in a conventional manner of making up a pair of connection flanges with the customary bolt type fasteners that draw them together. This invention is characterized by a pair of pipe flanges that are brought together, whereby the coupling is automatically operated to secure slip means and packing means.

This invention is concerned with pipelines and risers which require change, replacement or repair. Sub-surface marine installation of pipe is subject to deterioration and damage that must be corrected beneath the water surface. Also, system changes often require alteration in the piping. To these ends, sections of pipe are often and continuously altered, replaced, shut off or opened up into additional piping; and all of which necessitates couplings adapted to be installed beneath the water surface. Heretofore, couplings for this purpose have required separate operations to (1) connect pipe sections, (2) set the slips, and (3) compress the packing; or when these three operations are conducted together the couplings become overly complicated and difficult to assemble and install under sub-surface conditions. It is an object therefore, of this invention, to provide a simple coupling that is applicable to the end of one pipe section so as to be connected to the end of another continuing pipe section. In practice, the connection of pipe sections is by means of a pair of common pipe flanges.

It is an object of this invention to connect the open ends of pipe sections by means of a pair of pipe flanges while automatically setting slip means and packing means thereto. It is another object of this invention to provide piston means carried by one flange and engageable with the other flange to operate the slip means and packing means. It still another object of this invention to provide means by which the slip means and packing means are sequentially operated; or alternately a combination of said slip means and packing means by which they are sequentially operated. Still another object of this invention is to provide a pipe coupling for underwater installation wherein the cooperative sip means and packing means are carried by one pipe flange; the other pipe flange alone being secured to its pipe section as by means of welding or the like. In practice, any and all welding is conducted above surface when replacing pipe sections and risers; and all underwater welding and subsequent adjustments are eliminated. A feature of this invention is that the drawing together of two simple pipe flanges automatically sets the slips and compresses the packing, in sequence as will be described.

SUMMARY OF THE INVENTION

The coupling provided herein is such that it can be installed over the open end of one pipe section and secured to the flanged open end of another pipe section. Therefore, is it possible with this coupling to connect open pipe sections with a pair of pipe flanges or the like, by installing a flange on one pipe section to be bolted to a flange on the coupling. The coupling per se is a flanged unit engageable over one pipe section and having piston means engageable with the flange of the other pipe section for automatic operation of slip means and packing means, when the two flanges are drawn together. A feature of this coupling is that the slip means and packing means are sequentially operated, for the reason that the packing should or must be set or compressed before the slips are set; otherwise setting of the slips will preclude compression of the packing, a deficiency in many prior art couplings of the type under consideration.

The foregoing and various other objects and features of this invention will be apparent and fully understood from the following detailed description of the typical preferred forms and applications thereof, throughout which description reference is made to the accompanying drawings.

THE DRAWINGS

PREFERRED EMBODIMENT

Figure 1:
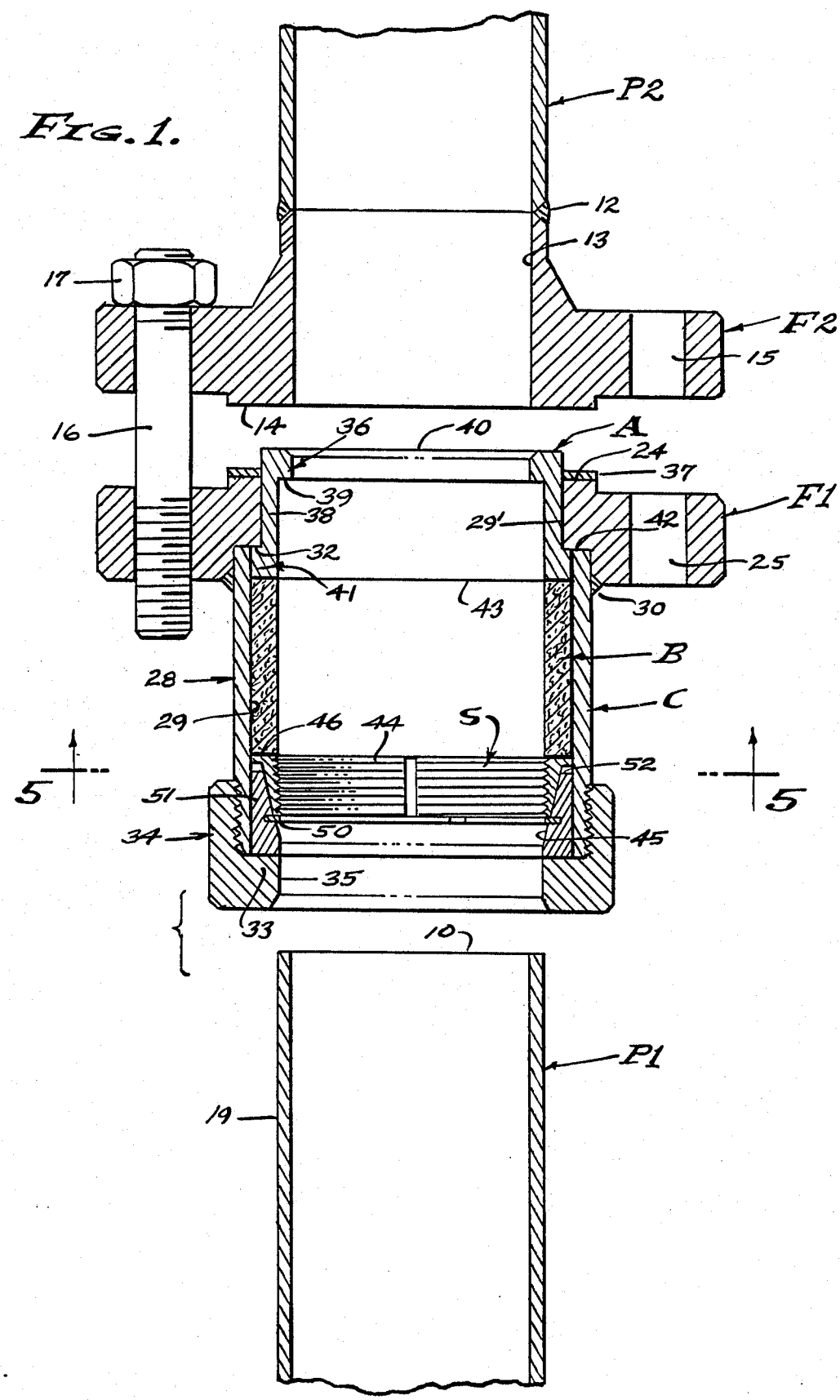
FIG. 1 is vertical sectional view of the flanged repair coupling of the present invention, preparatory to being installed over a cut off section of pipe and bolted to a flanged continuing section of pipe.
Figure 2:
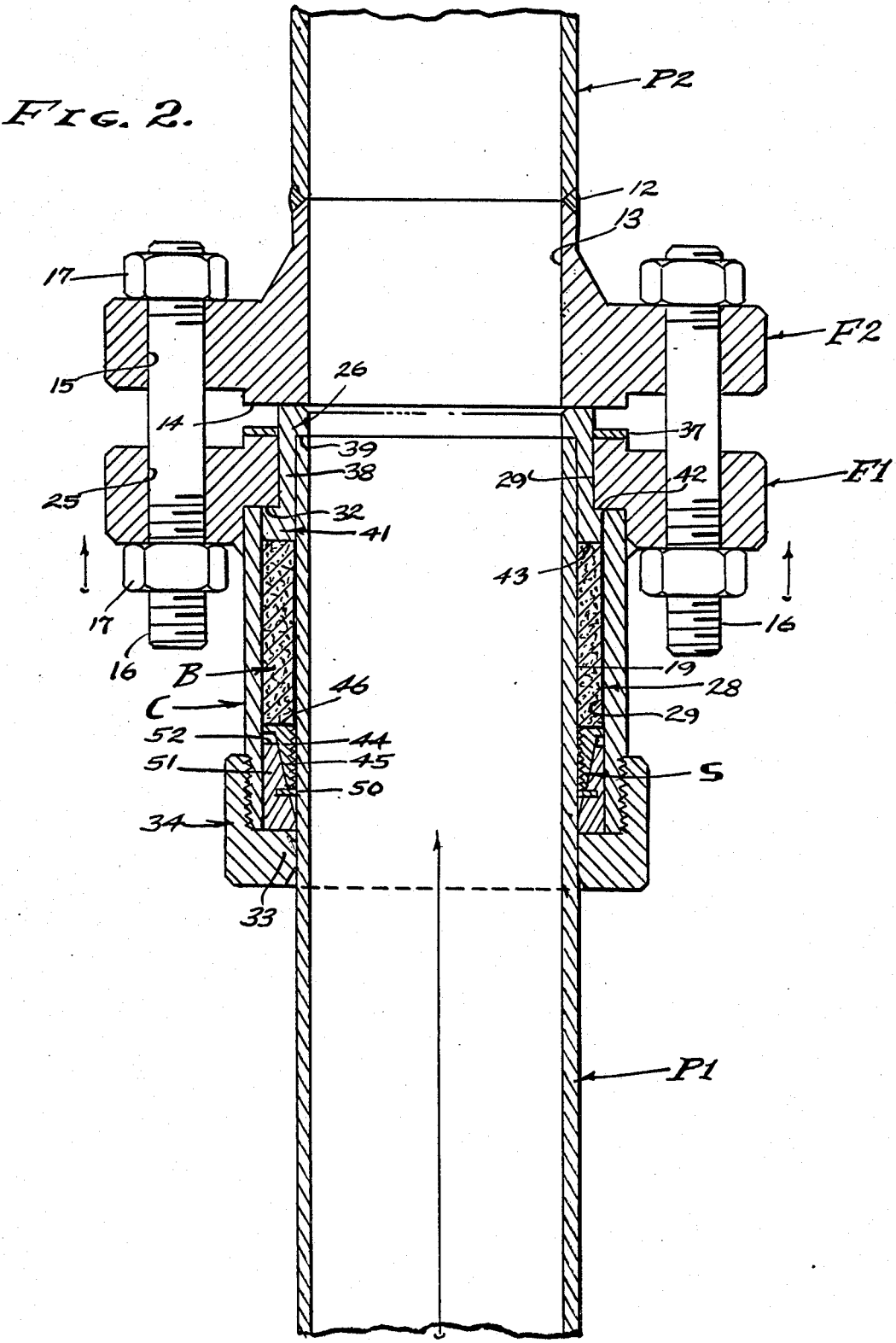
FIG. 2 is a view similar to FIG. 1 and shows the flanged repair coupling installed over the cut off section of pipe and piston means thereof brought into engagement with the flange of the continuing section of pipe.
Figure 3:
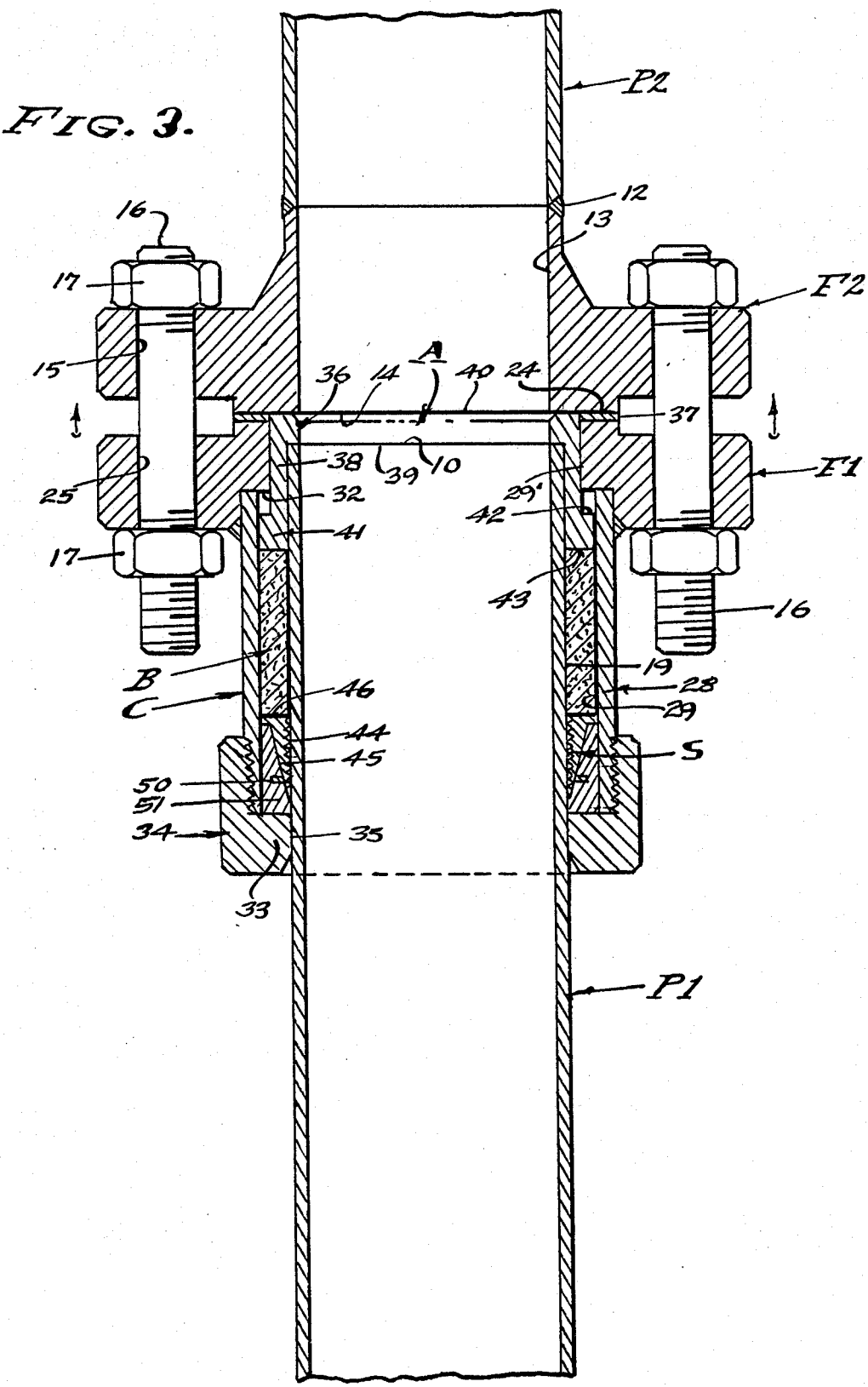
FIG. 3 is a view similar to FIGS. 1 and 2 and shows the flanged repair coupling operated by depression of the piston means, sequentially compressing the packing means and then setting the slip means.

Referring now to the drawings, the Flanged Repair Coupling C is a unit that is slidable over the open end of one pipe section P1 and engageable with the open end of another pipe section P2. The pipe section P1 is a new or old section of pipe that has been cut off to have an open end 10 substantially normal to its axis. The exterior of pipe section P1 is cleaned of surface debris, such as sea growth and corrosion, for a distance from end 10 so that only the cleaned portion enters into the coupling C as shown in FIGS. 2 and 3. The approximate distance cleaned is shown in FIG. 1; however a new section of pipe need not be cleaned. The pipe section P2 is a new or old section of pipe that has been fitted with a flange F2 or the like, a pipe flange welded or otherwise secured to the open end 10 of the pipe. As shown, flange F2 is a standard pipe flange welded at 12 to the pipe section P2 and characterized by a bore 13 coincidental with the inner diameter of said pipe. As shown, the flange F2 presents a sealing face 14 normal to its axis and immediately surrounding the bore 13. A circumferential bolt pattern of holes 15 surrounds the face 14 to receive bolts or studs 16 that extend parallel to the central axis of the coupling. The flange F2 is complementary to a flange F1 of the coupling, the inner faces of the flanges being engageable in the normal manner, it being understood that said flanges F2 can be of barrel configuration connected in any suitable manner.

Referring now to the Flanged Repair Coupling as a unit, the flange F1 thereof presents a sealing face 24 normal to its axis. A circumferential bolt pattern of holes 25 surrounds the face 24 to receive the bolts or studs 16 that extend from flange F2, to draw the flanges together when nuts 17 are torqued or tightened. The faces 14 and 24 are at the inner sides of flanges F1 and F2, and the coupling flange F1 carries a cylindrical body 28 that extends over the open end portion of pipe section P1, as shown in FIGS. 2 and 3, leaving a concentric annulus between its inner diameter 29 and the exterior diameter 19 of pipe section P1. Body 28 can be integral-with flange F1 or welded thereto at 30. Flange F2 can be a blind plate to close off pipe section P1.

In accordance with this invention, the flange F1 and extended body 28 cooperatively accommodate an actuator or piston means A, a packing means B, and an anchor or slip means S. The inner diameter bore 29 is inwardly stepped at 29' to form an outwardly (or downwardly) faced step shoulder 32 to capture the piston means, and the outer end (or bottom) of the body 28 is provided with a wall 33 that closes the aforesaid annulus. In practice, the wall 33 is established by a screw-on cap 34 threaded onto the exterior of body 28 and having a bore 35 slidably engageable over the exterior diameter 19 of pipe section P1. Accordingly, an outwardly or downwardly stepped annular chamber is formed to receive the piston means A, packing means B and slip means S.

The actuator or piston means A is mechanically operated by engagement with face 14 of flange F2 in order to axially compress the packing means B. A feature of this invention is that the piston means has a head portion 36 that projects inwardly from face 24, there being a surrounding seal 37 carried by face 24 and over the head portion to engage both face 14 and 24 in the usual manner. The piston means is shown as being comprised of a cylindrical portion 38 having an outer diameter slidable in stepped bore 29' and an inner diameter slidable over the terminal end portion diameter 19 of pipe section P1.

The cylindrical portion 38 carries the head portion 36 that has an inwardly turned shoulder 39 to engageably stop the terminal open end 10 of pipe section P1, the head portion 36 having a normal end (or top) face 40 to engage face 14 of flange F2, and having an outer diameter coincidental with that of cylinder portion 38. In accordance with this invention, the cylinder portion 38 also carries a ram portion 41 with an outwardly stepped shoulder 42 so that It slidably occupies the aforesaid annulus. The outward or bottom end of the ram portion 41 presents a face 43 normal to the central axis and engageable with the packing means B to compress the same. As shown, the shoulder 42 engages the step 32 when the head portion 36 extends from face 14 and seal 37 as shown in FIGS. 1 and 2 (also FIG. 4). Accordingly, the piston means A is adapted to slide through the stepped bore 29', carrying the pipe section P1 therewith, while the flange F1 is raised and/or drawn into engagement with the flange F2.

The packing means B is any suitable compressible material of the type commonly used for this purpose. In practice, the volumetric displacement of the packing is predetermined in order to fully occupy the annulus under pressure when the coupling C is fully actuated. The fully actuated condition is shown in FIG. 3. However, in FIG. 2 the piston means A and packing means B are shown before actuation. Note that the packing is a right cylinder of compressible packing material that slides down the bore 29, except that the outer or bottom end thereof is controllably stopped by the slip means S next described.

The anchor or slip means S is shown as an inwardly tapered split ring 44, or separate slip wedges, operable outwardly and downwardly on a complementary conical surface 45, so as to be forced radially inward upon downward movement of split ring 44 which constricts onto the exterior diameter g of pipe section P1. The split ring 44 presents an inner or upper face 46 to support the packing material, and the inner diameter of the ring is toothed so as to bite into the exterior surface of the pipe P1. In practice, the toothed exterior of split ring 44 is of thread formation for ease of manufacture, and so that it can be rotated to facilitate removal.

In accordance with this invention, the operation of packing means B and slip means S is sequential, and this is controlled by a shear ring 50 (or shear pins or the like). The conical surface is established by a sleeve 51 truncated at 52 to permit movement of the split ring 44 (or slip wedge), the split ring 44 being supported by the shear ring 50 prior to the application of axial pressure, as shown in FIGS. 1 and 2. The shear ring is selected so as to withstand axial pressure sufficient to fully compress the packing means B before its failure which then permits operation of the slip means S. Accordingly, the operation of packing mean B precedes operation of slip means S, whereby the prescribed actuation of the coupling C is ensured. As shown in FIGS. 1, 2 and 3 of the drawings, the bolts or studs 16 systematically draw the flanges together by uniformly tightening the nuts 17.

Figure 4:
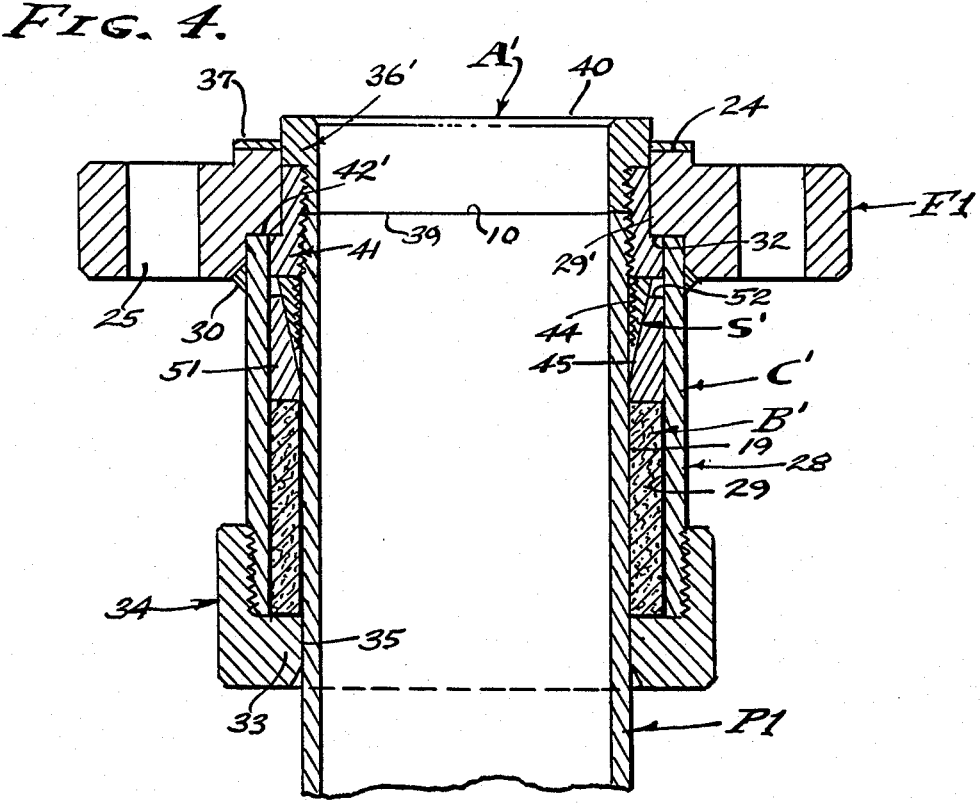
FIG. 4 is a vertical sectional view of the flanged repair coupling in a second embodiment wherein the piston means is extendable and is secured to the open end of the pipe section over which the coupling is installed.
Figure 5:
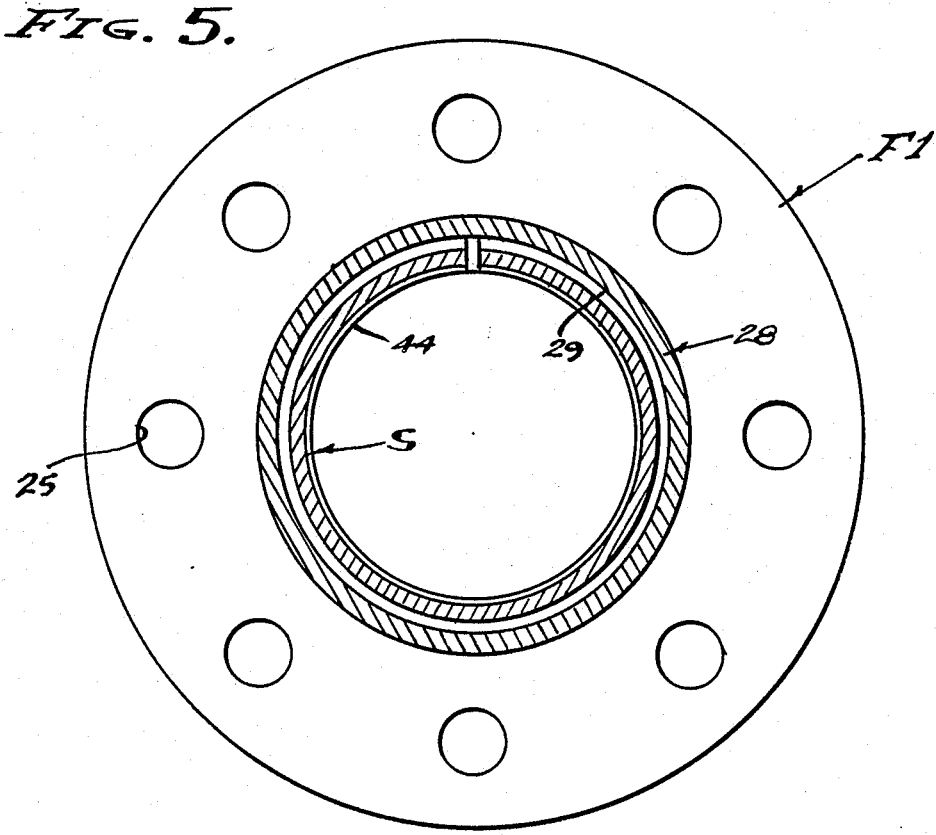
FIG. 5 is a sectional view taken as indicated by line 5—5 on FIG. 1.

In FIG. 4 of the drawings the second embodiment is shown devoid of the shear ring 50 and with the position of the packing means B' and slip means S' reversed, with respect to top and bottom, in which case the means B' and means S' tend to operate together. However, the pipe section P1 is threaded into the head portion 36', so that the end 10 of the pipe cannot separate from the shoulder 39 of the piston means A'. In this embodiment the face 42' bears against the split ring 44 to anchor it to the pipe P1, after which the pipe P1 and conical sleeve 51 move together in the body 28 to compress the packing means B'. The order of operation is reversed from that first described, but it is sequential, all as circumstances require. In all instances it is the Flanged Repair Coupling C that moves inwardly or upwardly on pipe P1 and into engagement with the mating flange F2 of pipe P2, thereby depressing the piston means for sequential operation of the packing means and slip means.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A repair coupling for connecting a first open ended pipe section to a flange having a sealing face at the open end of a second pipe section, and including;
- a coupling flange having a sealing face engageable with the sealing face of the flange at the open end of the second pipe section, the coupling flange being radially inwardly stepped to present a shoulder and a bore through said flange,
- a cylindrical body extending concentrically from the coupling flange and shoulder thereof and on an axis coincidental with the axis of the first open ended pipe section to be received therein, the cylindrical body having an inner diameter bore greater in diameter than the outside diameter of the first open ended pipe section to be received therein with an annulus therebetween and carrying a radially inwardly stepped wall remote from the coupling flange and with a bore in said wall to slidably engage over and pass the first open ended pipe section,
- piston means slidable axially within the annulus and with a head portion extending from the coupling flange to be depressed by the flange at the open end of the second pipe section and having a shoulder to engage the shoulder of the coupling flange to limit extension of the head portion of the piston means,
- slip means and packing means within the annulus to engage over and constrict onto the first open ended pipe section received therein and carried between the radially inwardly stepped shoulder of the coupling flange and the radially inwardly stepped wall of the cylinder body remote from the coupling flange and to be compressed axially be the piston means for constriction thereof into anchored and sealed engagement with the outside diameter of the first open ended pipe section inserted within said slip means and said packing means,
- and means to draw the two flanges together and axially depress the head portion of the piston means to constrict said slip means and said packing means.

2. The repair coupling for connecting open ended pipe sections as set forth in claim 1, wherein the sealing face of the coupling flange surrounds the head portion of the piston means and wherein a an end face on said head portion opposes and engages the sealing face of the flange at the open end of the second pipe section.

3. The repair coupling for connecting open ended pipe sections as set forth in claim 1, wherein the sealing face of the coupling flange surrounds the head portion of the piston means and wherein an end face on said head portion opposes and engages the sealing face of the flange at the open end of the second pipe section, there being a seal carried by the sealing face of the coupling flange to engage the sealing face of the flange at the open end of the second pipe section.

4. The repair coupling for connecting open ended pipe sections as set forth in claim 1, wherein the means to draw the two flanges together is a threaded bolt means.

5. The repair coupling for connecting open ended pipe sections as set forth in claim 1, wherein the means to draw the two flanges together is a circumferential pattern of threaded bolts extending through complementary holes through the two flanges.

6. The repair coupling for connecting open ended pipe sections as set forth in claim 1, wherein the piston means has a cylinder portion slidable in the stepped inner diameter bore and a ram portion forming said shoulder and having a face axially engaged with the slip means and packing means.

7. The repair coupling for connecting open ended pipe sections as set forth in claim 1, wherein the slip means is restrained by shear means for first compressing the packing means and subsequent operation of the slip means.

8. The repair coupling for connecting open ended pipe sections as set forth in claim 1, wherein the packing means is directly engaged with the piston means and is compressed thereby against a face on the slip means for applying axial pressure thereto.

9. The repair coupling for connecting open ended pipe sections as set forth in claim 1, wherein the slip means is restrained by shear means for compressing the packing means, the slip means being subsequently operable for sequential operation of the slip means and then the packing means, and wherein the packing means is directly engaged by the piston means and is compressed thereby against the face on the slip means for applying axial pressure thereto.

10. The repair coupling for connecting open ended pipe sections as set forth in claim 1, wherein the slip means is comprised of a tapered surface and an inwardly constrictable wedge to engage the outside diameter of the first pipe section.

11. The repair coupling for connecting open ended pipe sections as set forth in claim 1, wherein the packing means is comprised of a compressible elastomeric material.

12. The repair coupling for connecting open ended pipe sections as set forth in claim 1, wherein the slip means is comprised of a tapered surface and an inwardly constrictable wedge to engage the outside diameter of the first pipe section, and wherein the packing means is comprised of a compressible elastomeric material.

13. The repair coupling for connecting open ended pipe sections as set forth in claim 1, wherein the remote end of the cylindrical body is closed by a cap forming said radially inwardly stepped wall with the bore to slidably engaged over the first pipe section.

14. The repair coupling for connecting open ended pipe sections as set forth in claim 1, wherein the slip means is directly engaged by the piston means and axially depressed thereby to engage the outside diameter of the first pipe section and having a face engaged with the packing means to compress the same.

15. The repair coupling for connecting open ended pipe sections as set forth in claim 14 wherein the piston means is internally threaded to threadedly engage with the end portion of the first pipe section.

16. The repair coupling for connecting open ended pipe sections as set forth in claim 1, wherein the piston means is internally threaded to threadedly engage with the end portion of the first pipe section.

17. The repair coupling for connecting open ended pipe sections as set forth in claim 1, wherein the head portion of the piston is threadedly engaged onto a cylinder portion of the piston means slidable in the radially inwardly stepped inner diameter bore open at the coupling flange.

18. The repair coupling for connecting open ended pipe sections as set forth in claim 1, wherein the slip means is a split ring with inner diameter teeth engageable with the outer diameter of the first pipe section.

19. The repair coupling for connecting open ended pipe sections as set forth in claim 1, wherein the slip means is a split ring with inner diameter teeth of helical thread form engageable with the outer diameter of the first pipe section.

* * * * *